United States Patent
Harada et al.

(10) Patent No.: US 11,496,406 B2
(45) Date of Patent: Nov. 8, 2022

(54) TRANSFER APPARATUS, TRANSFER METHOD, AND TRANSFER PROGRAM

(71) Applicant: NIPPON TELEGRAPH AND TELEPHONE CORPORATION, Tokyo (JP)

(72) Inventors: Rintaro Harada, Tokyo (JP); Hiroyuki Uzawa, Tokyo (JP); Hirotaka Nakamura, Tokyo (JP); Daisuke Hisano, Tokyo (JP); Hirotaka Ujikawa, Tokyo (JP); Jun Terada, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 22 days.

(21) Appl. No.: 17/057,034

(22) PCT Filed: May 8, 2019

(86) PCT No.: PCT/JP2019/018407
§ 371 (c)(1),
(2) Date: Nov. 19, 2020

(87) PCT Pub. No.: WO2019/225315
PCT Pub. Date: Nov. 28, 2019

(65) Prior Publication Data
US 2021/0112016 A1  Apr. 15, 2021

(30) Foreign Application Priority Data

May 24, 2018 (JP) ............................ JP2018-100013

(51) Int. Cl.
*H04L 47/6275* (2022.01)
*H04L 47/28* (2022.01)
*H04L 12/28* (2006.01)

(52) U.S. Cl.
CPC .......... *H04L 47/6275* (2013.01); *H04L 12/28* (2013.01); *H04L 47/28* (2013.01)

(58) Field of Classification Search
CPC ..... H04L 12/28; H04L 47/28; H04L 47/6275; H04L 47/562; H04L 47/524; H04L 47/50
See application file for complete search history.

(56) References Cited

U.S. PATENT DOCUMENTS 10,721,187 B1 * 7/2020 Goldman ............ H04L 49/3027
2010/0183021 A1 * 7/2010 Cloonan ............... H04L 47/283
370/412

(Continued)

FOREIGN PATENT DOCUMENTS

JP   2016201641 A   12/2016

OTHER PUBLICATIONS

3rd Generation Partnership Project; Technical Specification Group Radio Access Network; Study on new radio access technology: Radio access architecture and interfaces(Release 14), Mar. 2017.

(Continued)

*Primary Examiner* — Omer S Mian
(74) *Attorney, Agent, or Firm* — Harness, Dickey & Pierce, P.L.C.

(57) ABSTRACT

A transfer apparatus include a distribution unit, a storage unit, and a transfer unit, in which the distribution unit is configured to identify a plurality of networks to which frames belong, distribute the frames for each of the networks based on an identification result, and store the distributed frames in the storage unit, the storage unit is configured to store information of a time at which a frame of the frames is stored in the storage unit and the frame in association with each other, and the transfer unit is configured to detect a period of time for which the frame stays in the storage unit, detect a remaining period to send which is a remaining time (Continued)

of a time for which the frame is permitted to stay in the storage unit, for each of the frames, based on a difference between the time for which the frame stays in the storage unit and the delay upper limit value, and output the frame to a predetermined apparatus based on the remaining period to send.

6 Claims, 9 Drawing Sheets

(56) References Cited

U.S. PATENT DOCUMENTS

2017/0346601 A1* 11/2017 Lee .................. H04L 1/1887
2020/0145873 A1* 5/2020 Park ................. H04W 28/0284

OTHER PUBLICATIONS

Takehiro Nakamura, "Toward introduction of 5G in 2020", pp. 21, MPLS Japan 2016, 2016.
Iwao Toda, "Network QoS technology", pp. 45-46, Ohmsha, Ltd., 2001.

* cited by examiner

TRANSFER APPARATUS, TRANSFER METHOD, AND TRANSFER PROGRAM

CROSS-REFERENCE TO RELATED APPLICATIONS

This application is a 371 National Stage of International Application No. PCT/JP2019/018407 filed on May 8, 2019, which claims priority to Japanese Patent Application No. 2018-100013, filed May 24, 2018. The entire disclosures of the above applications are incorporated herein by reference.

TECHNICAL FIELD

The present disclosure relates to a transfer apparatus, a transfer method, and a transfer program.

BACKGROUND ART

In a network such as a mobile fronthaul (MFH), the function of a base station may be divided into a function on a higher layer side and a function on a lower layer side. FIG. 8 is a diagram illustrating an example of a configuration of a mobile fronthaul. A mobile fronthaul 100 has a configuration of a centralized-radio access network (C-RAN). In FIG. 8, the mobile fronthaul 100 includes a plurality of central units (CUs) 101 and a plurality of distributed units (DUs) 102.

The central unit 101 is an aggregate base station and executes a function on a higher layer side of the base station. For example, the plurality of central units 101 acquire signals constituted by a frame group from a higher network (not illustrated) in which frame delay requirements differ from each other. The plurality of central units 101 output the frames belonging to the signals having different delay requirements to a transfer apparatus 103. The distributed unit (DU) 102 is a remote station and executes a function on a lower layer side of the base station. For example, the distributed unit 102 communicates with a user terminal using radio waves.

FIG. 9 is a diagram illustrating an example of a detailed configuration of the mobile fronthaul 100. The mobile fronthaul 100 includes the plurality of central units 101, the plurality of distributed units 102, the transfer apparatus 103, and a passive optical network (PON) 104. The passive optical network 104 is an optical network. The passive optical network 104 includes an optical line terminal (OLT) 105, an optical splitter 106, and a plurality of optical network units (ONUs) 107.

The transfer apparatus 103 acquires the frames of the signals having different delay requirements from the plurality of central units 101. The transfer apparatus 103 time-multiplexes the frames which are input from the plurality of central units 101 and transfers the time-multiplexed frames to the optical line terminal 105. The optical line terminal 105 generates an optical signal depending on the time-multiplexed frame and outputs the generated optical signal to the optical splitter 106. The optical splitter 106 demultiplexes the optical signal and outputs the demultiplexed optical signal to the optical network units 107. The optical network unit 107 outputs an electrical signal corresponding to the optical signal to the distributed unit 102.

A plurality of function split points for splitting functions of a base station of a fifth generation mobile communication system (5G) into functions on a higher layer side and functions on a lower layer side have been examined. For example, a lower layer split (LLS) is a function split point at which functions of a base station are divided within a lower layer (physical layer). For example, a higher layer split (HLS) is a function split point at which functions of a base station are divided within a higher layer (see Non Patent Literature 1).

A delay requirement (delay upper limit value) determined for a signal to which a frame belongs is different for each function split point. For example, the delay upper limit value of the LLS in the mobile fronthaul 100 is 250 s. For example, the delay upper limit value of the HLS in the mobile fronthaul 100 is from 1.5 ms to 10 ms (see Non Patent Literature 2).

The passive optical network 104 transmits the time-multiplexed frames to the plurality of distributed units 102 having different function split points. Thereby, the passive optical network 104 can improve the line concentration efficiency of the mobile fronthaul 100.

The transfer apparatus 103 may control the order of transfer of the time-multiplexed frames to the passive optical network 104 based on strict priority queuing (SPQ).

FIG. 10 is a diagram illustrating an example of a configuration of the transfer apparatus 103. The transfer apparatus 103 includes a distribution unit 108, a storage unit 109, and a transfer unit 110. The distribution unit 108 identifies the priority of a signal to which a frame input to the distribution unit 108 belongs on the basis of, for example, the value of a class of service (CoS) of a virtual local area network (VLAN) tag of the frame. The storage unit 109 includes a queue 111 for each priority of the signal to which the frame belongs. The distribution unit 108 stores the frame in the queue 111 for each priority of the signal to which the frame belongs.

The queue 111 has a first in, first out (FIFO) structure. The queue 111 stores the frame for each identified priority. The transfer unit 110 selects a queue 111 in descending order of the identified priority among the queues 111 which are not empty. The transfer unit 110 transfers a leading frame, which is a frame at the head of the queue, to the optical line terminal 105 from the selected queue 111. Such strict priority queuing allows the transfer apparatus 103 to transfer a frame belonging to a signal having the highest priority to the optical line terminal 105 with a low delay (see Non Patent Literature 3).

CITATION LIST

Non Patent Literature

Non Patent Literature 1: 3GPP TR38.801 v14
Non Patent Literature 2: Takehiro Nakamura, "Toward introduction of 5G in 2020", pp. 21, MPLS Japan 2016, 2016
Non Patent Literature 3: Iwao Toda, "Network QoS technology", pp. 45-46, Ohmsha, Ltd., 2001

SUMMARY OF THE INVENTION

Technical Problem

However, in a transfer apparatus of the related art, a frame belonging to a signal having a low priority cannot be transferred to an optical line terminal with a low delay in a case where a frame belonging to a signal having a high priority is stored in a queue. In this manner, the transfer apparatus may not be able to transfer the frame belonging to the signal having a low priority so as to satisfy a delay requirement.

In view of the above-described circumstances, an advantage of the present disclosure is to provide a transfer apparatus, a transfer method, and a transfer program which are capable of transferring a frame belonging to a signal having a low priority so as to satisfy a delay requirement.

Means for Solving the Problem

An aspect of the present disclosure is a transfer apparatus including a distribution unit, a storage unit, and a transfer unit, in which the distribution unit is configured to identify a plurality of networks to which frames acquired from the plurality of networks belong, and distribute and store the frames in the storage unit for each of the plurality of networks based on identification results, the plurality of networks being different from each other in a delay upper limit value of each of the frames, the storage unit is configured to store information of a time at which a frame of the frames is stored in the storage unit and the frame in association with each other, and the transfer unit is configured to detect a period of time for which the frame stays in the storage unit, detect a remaining period to send which is a remaining time of a time for which the frame is permitted to stay in the storage unit, for each of the frames, based on a difference between the time for which the frame stays in the storage unit and the delay upper limit value, and output the frame to a predetermined apparatus based on the remaining period to send.

In the above-described transfer apparatus according to the aspect of the present disclosure, the storage unit is configured to store the frames in a queue for each of the networks, and the transfer unit is configured to detect the remaining period to send on the basis of a difference between a time for which a leading frame of the frames of the queue stays in the queue and the delay upper limit value, for each of the leading frames, and output the leading frame to a predetermined apparatus on the basis of the remaining period to send.

In the above-described transfer apparatus according to the aspect of the present disclosure, the transfer unit is configured to output the leading frame for which the remaining period to send is shortest to a predetermined apparatus.

In the above-described transfer apparatus according to the aspect of the present disclosure, the transfer unit is configured to output, in a case where the number of the leading frames for which the remaining period to send is shortest is plural, each of the leading frames to a predetermined apparatus in an order based on priority determined for the frames in advance.

In the above-described transfer apparatus according to the aspect of the present disclosure, the transfer unit is configured to detect, for the queue that is predetermined, a trigger time to send which is a time at which the leading frame stored in the queue predetermined is permitted to be output, and output the leading frame to a predetermined apparatus on or after the trigger time to send from each of the queues in which the trigger time to send is detected.

In the above-described transfer apparatus according to the aspect of the present disclosure, the transfer unit is configured to determine whether the frame for which the delay upper limit value is determined is stored in the storage unit, and output the leading frame belonging to a signal for which the delay upper limit value is not determined to a predetermined apparatus in a case where the frame for which the delay upper limit value is determined is not stored in the storage unit.

Another aspect of the invention is a transfer method executed by a transfer apparatus including a distribution unit, a storage unit, and a transfer unit, the transfer method including identifying, by the distribution unit, a plurality of networks to which frames acquired from the plurality of networks belong, distributing and storing the frames in the storage unit for each of the plurality of networks based on identification results, the plurality of networks being different from each other in a delay upper limit of each of the frames, storing, by the storage unit, information of a time at which a frame of the frames is stored in the storage unit and the frame in association with each other, and detecting, by the transfer unit, a period of time for which the frame stays in the storage unit, detecting a remaining period to send which is a remaining time of a time for which the frame is permitted to stay in the storage unit for each of the frames, based on a difference between the time for which the frame stays in the storage unit and the delay upper limit value, and outputting the frame to a predetermined apparatus based on the remaining period to send.

Still another aspect of the present disclosure is a transfer program for causing a computer to operate as the transfer apparatus described above.

Effects of the Invention

According to the present disclosure, it is possible to transfer a frame belonging to a signal having a low priority so as to satisfy a delay requirement.

DESCRIPTION OF EMBODIMENTS

Embodiments of the present disclosure will be described in detail with reference to the drawings.

First Embodiment

Figure 1:
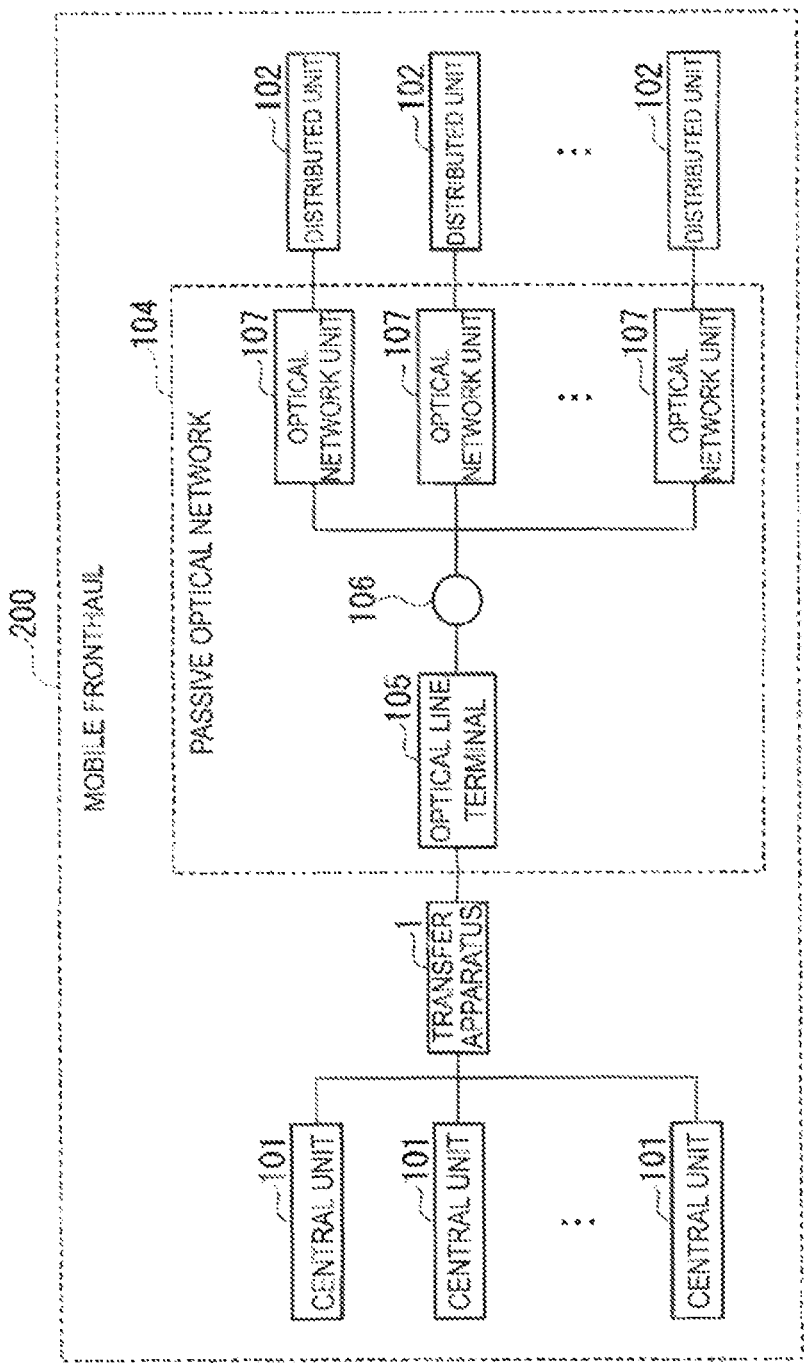
FIG. 1 is a diagram illustrating an example of a configuration of a mobile fronthaul according to a first embodiment.
Figure 9:
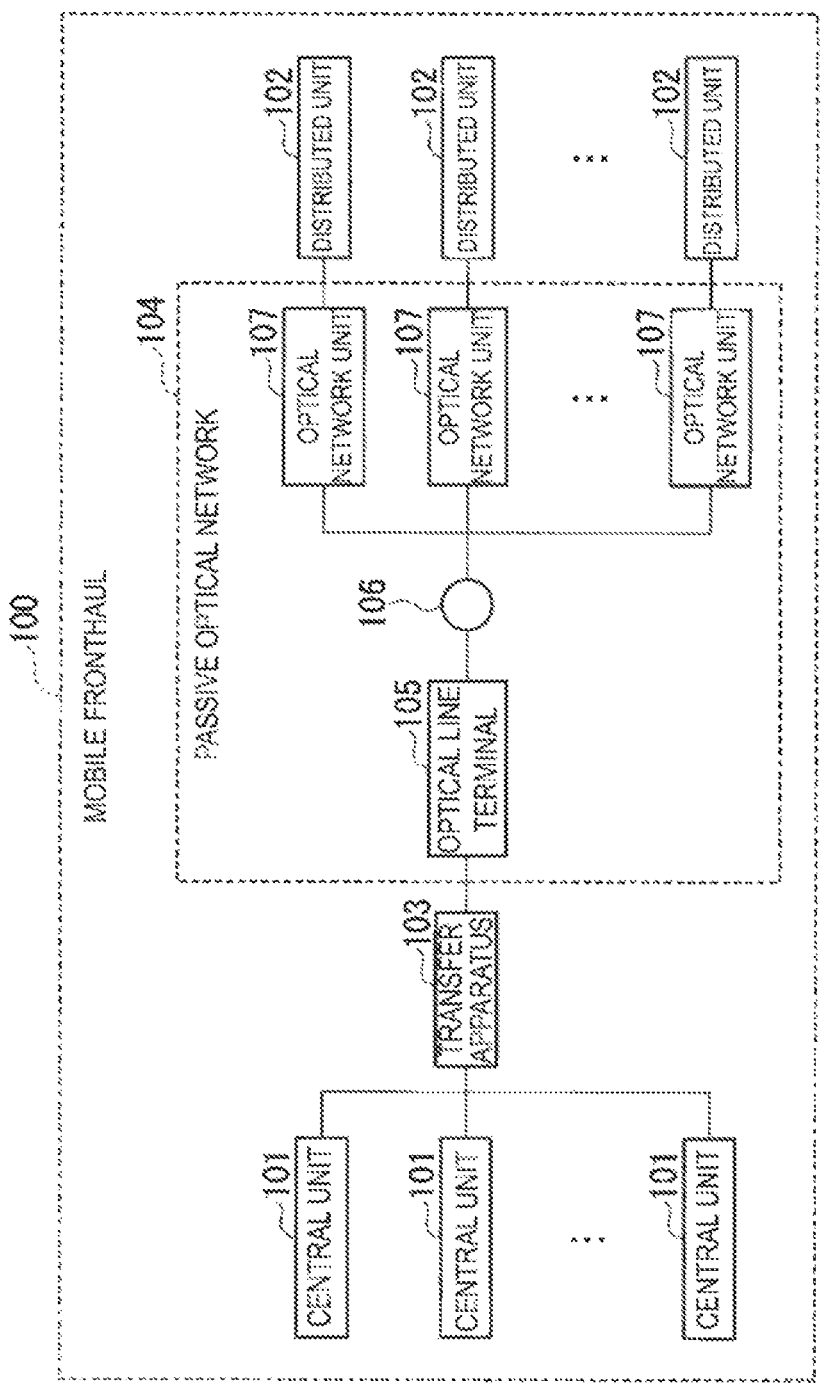
FIG. 9 is a diagram illustrating an example of a detailed configuration of a mobile fronthaul.
Figure 10:
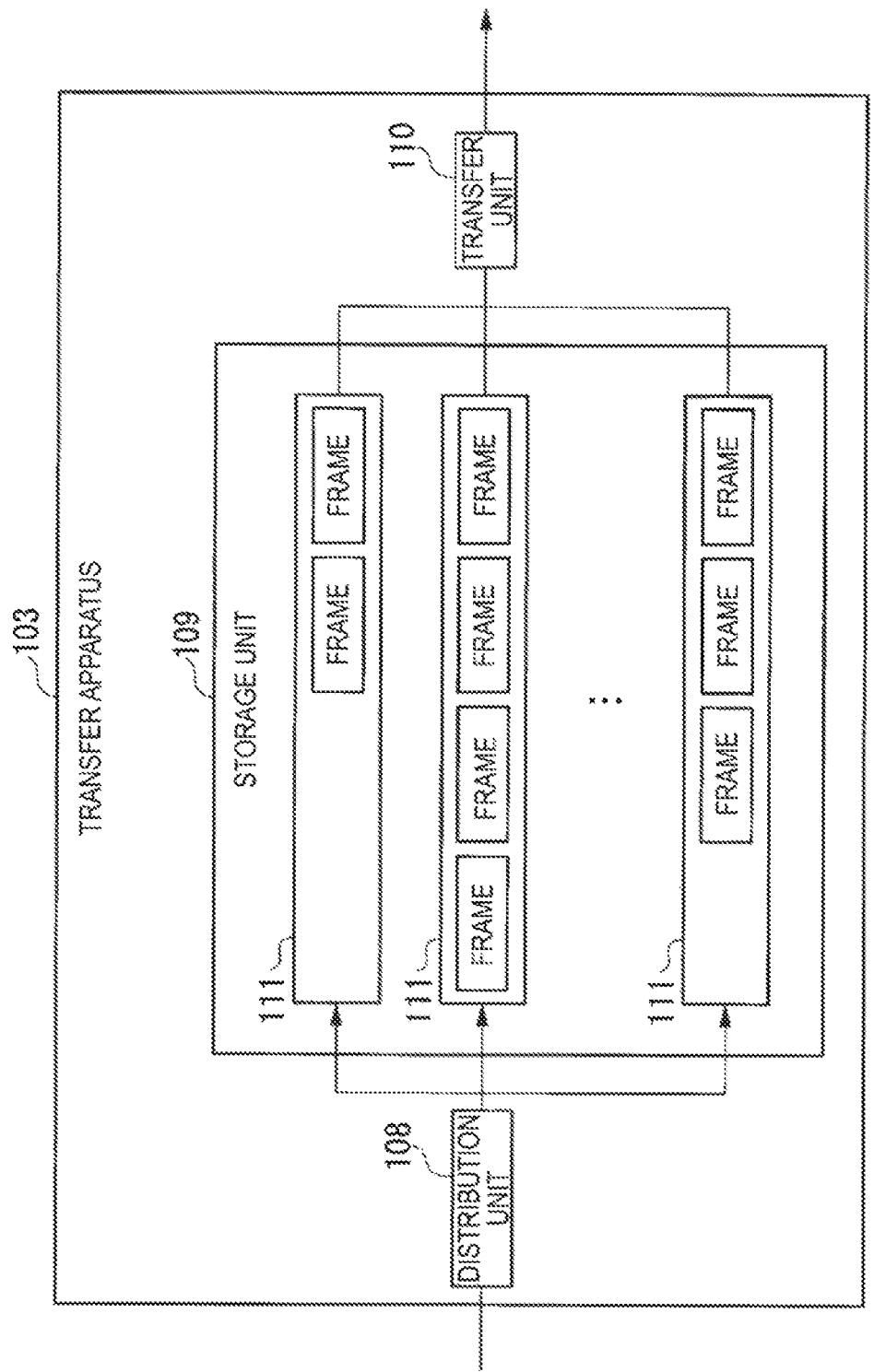
FIG. 10 is a diagram illustrating an example of a configuration of a transfer apparatus.

FIG. 1 is a diagram illustrating an example of a configuration of a mobile fronthaul 200. The mobile fronthaul 200 includes a transfer apparatus 1, a plurality of central units 101, a plurality of distributed units 102, and a passive optical network 104. Configurations of the plurality of central units 101, the plurality of distributed units 102, and the passive optical network 104 illustrated in FIG. 1 are similar to those of the functional units having the same reference numerals illustrated in FIG. 9.

The transfer apparatus 1 acquires frames of signals having different delay requirements from the plurality of central units 101. The delay requirements are requirements for performing transfer with a stay time equal to or less than a delay upper limit value. The transfer apparatus 1 includes a queue for each of the signals having different delay requirements. The transfer apparatus 1 stores the frames of the signals in the queue for each of the signals having different delay requirements.

The remaining time of a time for which the frame is permitted to stay in the queue (hereinafter, referred to as a "remaining period to send") (RPS) is expressed by a difference (remaining time) between a period of time for which the frame stays in the queue and the delay upper limit value. The transfer apparatus 1 detects the remaining period to send for each leading frame stored in the queue. The transfer apparatus 1 transfers the leading frame stored in the queue to an optical line terminal 105 in ascending order of the remaining period to send.

The frame is time-multiplexed in this manner, so that the transfer apparatus 1 can transfer the frame belonging to the signal having a low priority to the optical line terminal 105 so as to satisfy the delay requirement. That is, the transfer apparatus 1 can transfer the frame belonging to the signal having a low priority to the optical line terminal 105 with a stay time equal to or less than the delay upper limit value.

Figure 2:
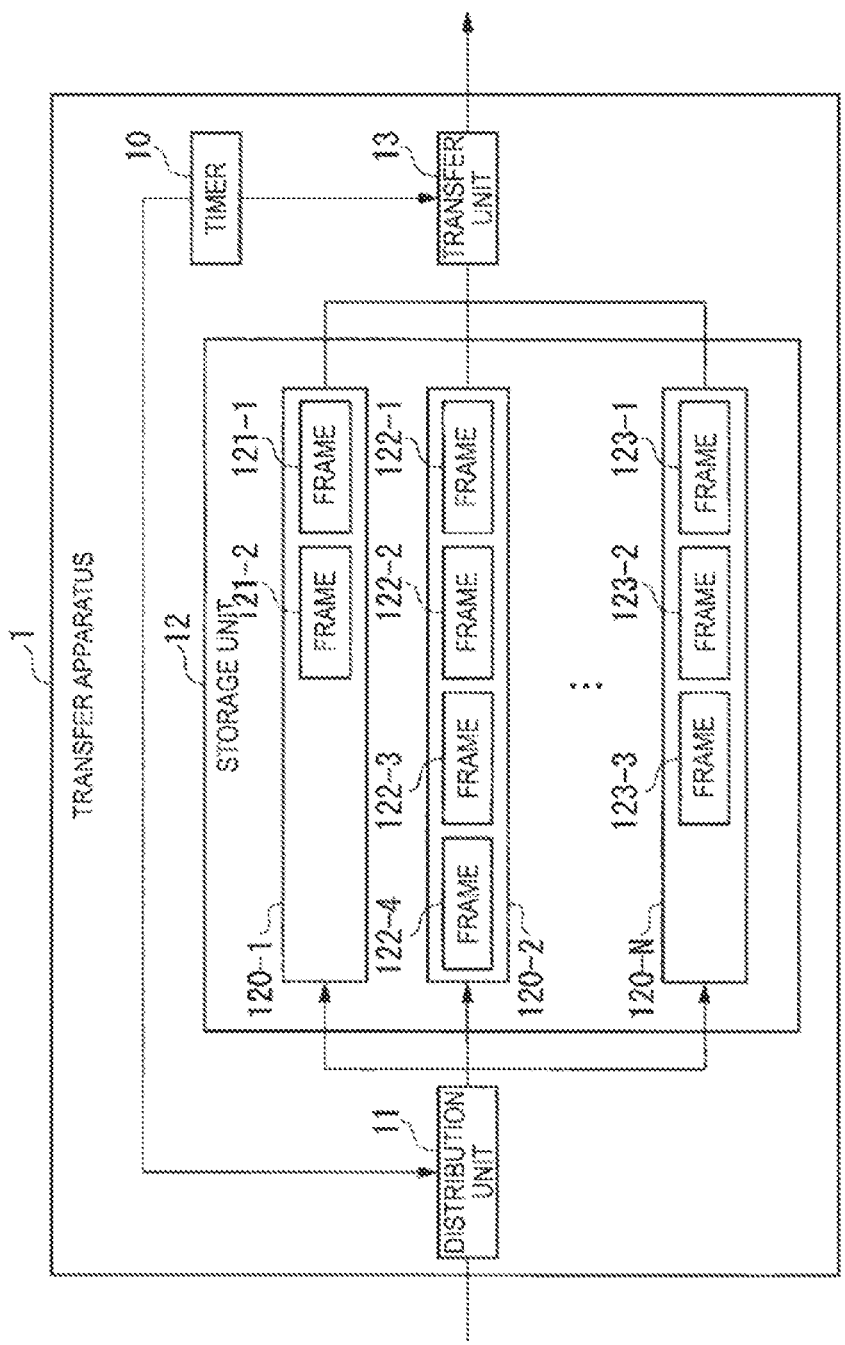
FIG. 2 is a diagram illustrating an example of a configuration of a transfer apparatus according to the first embodiment.

FIG. 2 is a diagram illustrating an example of a configuration of the transfer apparatus 1. The transfer apparatus 1 includes a timer 10, a distribution unit 11, a storage unit 12, and a transfer unit 13. The timer 10 generates a signal representing a current time $t_{now}$, and outputs the signal representing the current time to the distribution unit 11 and the transfer unit 13.

The distribution unit 11 acquires a signal constituted by a plurality of frames from the plurality of central units 101. The distribution unit 11 acquires the signal representing the current time from the timer 10. The distribution unit 11 records, in the storage unit 12, current time information at a time $t_{arrive}$ at which the frame is input as information of a time at which the frame is stored in a queue of the storage unit 12 (hereinafter, referred to as "reception time information"). The distribution unit 11 records the frame and the reception time information in the storage unit 12 in association with each other. The distribution unit 11 may record the reception time information of the frame in the storage unit 12 by writing the reception time information in a dedicated tag of the frame.

The distribution unit 11 identifies a network through which a signal to which a frame input to the distribution unit 11 belongs is transmitted, for example, on the basis of the value of a CoS (the priority of a communication service) of a virtual LAN (VLAN) tag of a frame. That is, the distribution unit 11 identifies a communication service of the signal to which the input frame belongs. In other words, the distribution unit 11 identifies the delay requirement (delay upper limit value) determined for the signal to which the input frame belongs. The distribution unit 11 distributes the frames for each network and stores the distributed frames in the storage unit 12 on the basis of identification results.

The storage unit 12 includes a queue 120 for each of the networks (signals) having different delay requirements. In FIG. 2, the storage unit 12 includes N number of queues 120 (N is a value representing the type of signal). The queue 120 stores the frames for each of the networks having the different delay requirements. In FIG. 2, a queue 120-1 stores frames 121-1 and 121-2. A queue 120-2 stores frames 122-1 to 122-4. A queue 120-N stores frames 123-1 to 123-3.

Meanwhile, the storage unit 12 may store programs executed by the distribution unit 11 and the transfer unit 13 in a case where the storage unit 12 includes a non-volatile storage apparatus (non-transitory recording medium) such as a flash memory. At least some of the functions of the transfer apparatus 1 may be implemented by executing a program.

The transfer unit 13 is a functional unit that gives a permission to transfer the frame to the queue 120. The transfer unit 13 stores information representing the delay upper limit value in advance. The transfer unit 13 may acquire the information representing the delay upper limit value from the storage unit 12. The delay upper limit value may be a value which is determined in advance for each communication service, or may be a value calculated on the basis of the value determined in advance for each communication service.

In a case where a leading frame is stored in the queue 120, the transfer unit 13 detects the remaining period to send for each queue 120 (leading frame) on the basis of a difference between the period of time for which the leading frame stays in the queue and the delay upper limit value. The transfer unit 13 detects the remaining period to send of the leading frame for each queue 120 which is not empty. The remaining period to send $RPS_i$ is represented as Equation (1).

$$RPS_i = d_i - (t_{now} - t_{arrive}) \quad (1)$$

Here, $t_{now}$ represents the current time. In addition, $t_{arrive}$ represents the time at which the frame is received. Thus, $(t_{now} - t_{arrive})$ represents the period of time for which the leading frame stays in the queue. In addition, di represents the delay upper limit value ($0 < d_1 \leq d_2 \leq \ldots \leq d_N$). Here, i is an index of the signal (delay requirement) and is an integer of 1 or greater and N or less.

The transfer unit 13 selects the queue 120 in which the remaining period to send of the leading frame is the shortest.

The transfer unit 13 gives a permission to output the leading frame to the queue 120 selected on the basis of the remaining period to send. That is, the transfer unit 13 outputs the leading frame to the optical line terminal 105 from the queue 120 selected on the basis of the remaining period to send.

Next, an example of operations of the distribution unit 11 and the transfer unit 13 will be described.

Figure 3:
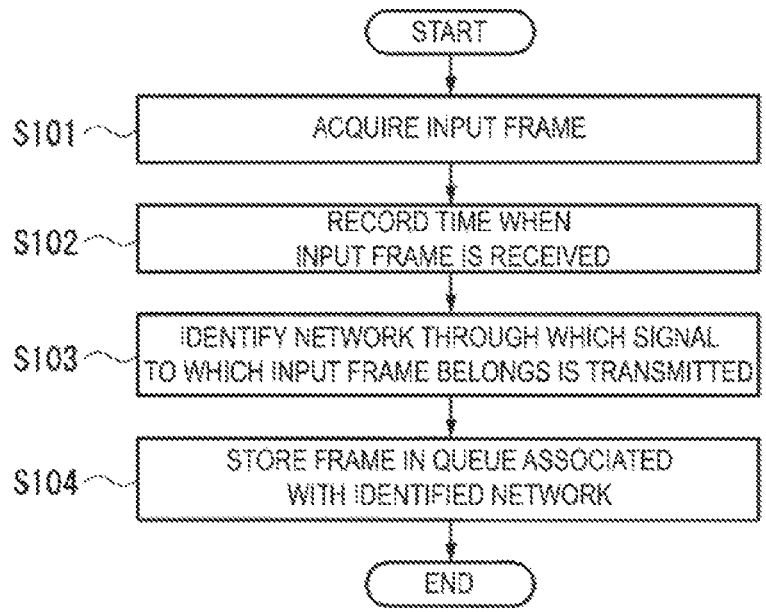
FIG. 3 is a flowchart illustrating an example of operations of a distribution unit according to the first embodiment.

FIG. 3 is a flowchart illustrating an example of operations of the distribution unit 11. In a case where the frame is input to the transfer apparatus 1 from the central unit 101, the distribution unit 11 acquires the input frame (step S101). The distribution unit 11 records the time at which the input frame is received in the storage unit 12 (step S102). The distribution unit 11 identifies a network through which the signal to which the input frame belongs has been transmitted (step S103). The distribution unit 11 stores the input frame in the queue 120 associated with the identified network (step S104).

Figure 4:
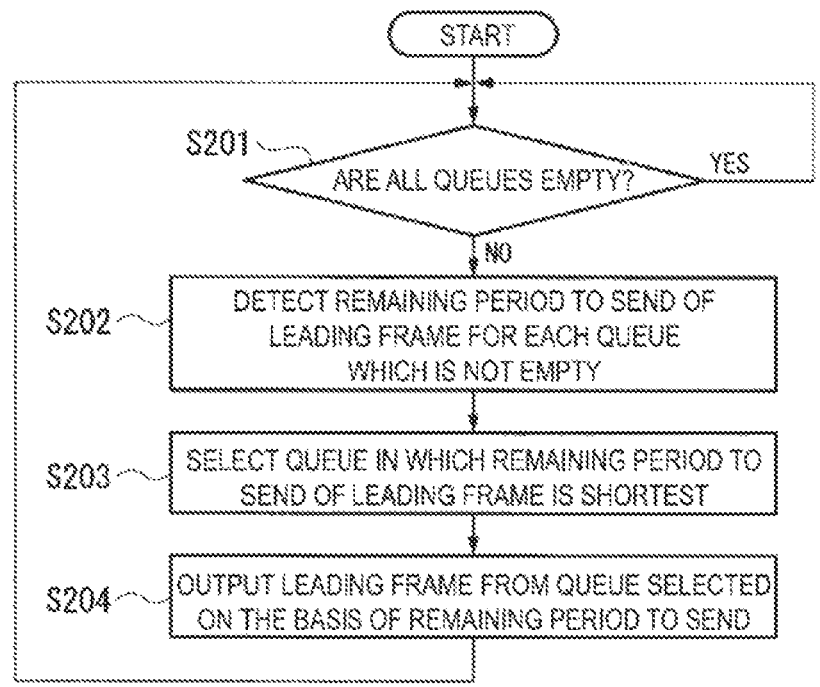
FIG. 4 is a flowchart illustrating an example of operations of a transfer unit according to the first embodiment.

FIG. 4 is a flowchart illustrating an example of operations of the transfer unit 13. The transfer unit 13 determines whether all of the queues 120 are empty (step S201). In a case where all of the queues 120 are empty (step S201: YES), the transfer unit 13 executes the processing of step S201 again after a predetermined period of time. In a case where the frame is stored in any one queue 120 (step S201: NO), the transfer unit 13 detects the remaining period to send of the leading frame for each of the queues 120 which are not empty (step S202). The transfer unit 13 selects the queue 120 in which the remaining period to send of the leading frame is the shortest (step S203). The transfer unit 13 outputs the leading frame to the optical line terminal 105 from the queue 120 selected on the basis of the remaining period to send (step S204).

As described above, the transfer apparatus 1 according to the first embodiment includes the distribution unit 11 (distributor), the storage unit 12 (storage medium), and the transfer unit 13 (transmitter). The distribution unit 11 identifies, from one another, a plurality of networks in which delay upper limit values of frames are different from each other and to which the frames acquired from the plurality of networks belong. The distribution unit 11 distributes the frames for each network and stores the distributed frames in the storage unit 12 on the basis of identification results. The storage unit 12 stores the frames in the queue 120 for each network. The storage unit 12 stores information of the time at which each frame is stored in the queue 120 and the frame in association with each other. The transfer unit 13 detects a period of time for which the frame stays in the storage unit 12 (queue 120). The remaining period to send is detected for each frame on the basis of the difference between the period of time for which the frame stays in the storage 12 and the delay upper limit value. The transfer unit 13 detects the remaining period to send for each leading frame on the basis of the difference between the period of time for which the leading frame stays in the queue and the delay upper limit value. The transfer unit 13 outputs the leading frame having the shortest remaining period to send to a predetermined apparatus.

Thereby, the transfer apparatus 1 according to the first embodiment can improve the transmission efficiency of the frame belonging to the signal having a low priority.

Second Embodiment

A second embodiment differs from the first embodiment in that there is a plurality of queues in which the remaining period to send of the leading frame is the shortest. In the second embodiment, differences from the first embodiment will be described.

When the leading frame is stored in the queue 120, the transfer unit 13 detects the remaining period to send for each queue 120 on the basis of the difference between the period of time for which the leading frame stays in the queue and the delay upper limit value. The transfer unit 13 detects the remaining period to send of the leading frame for each queue 120 which is not empty. The transfer unit 13 detects the remaining periods to send of the leading frames for all of the queues 120 except for the empty queue 120. The transfer unit 13 selects the queue 120 in which the remaining period to send of the leading frame is the shortest.

In a case where one queue 120 is selected, the transfer unit 13 gives an output permission to the queue 120 in which the remaining period to send of the leading frame is the shortest. That is, the transfer unit 13 outputs the leading frame to the optical line terminal 105 from the queue 120 in which the remaining period to send of the leading frame is the shortest.

Meanwhile, in a case where the remaining period to send of the leading frame is a negative value, the leading frame is stored in the queue 120 for a period of time exceeding a stay allowable time. In a case where the remaining period to send of the leading frame is a negative value, the transfer unit 13 may output the leading frame to the optical line terminal 105 in order from the queue 120 storing the frame belonging to the signal having a small delay upper limit value is.

When a plurality of queues 120 is selected on the basis of the remaining period to send, the transfer unit 13 outputs, from each of the selected queues 120, the leading frame to the optical line terminal 105 in descending order of priority determined in advance. The priority becomes higher, for example, as the delay upper limit value determined for the signal to which the leading frame belongs becomes smaller.

Figure 5:
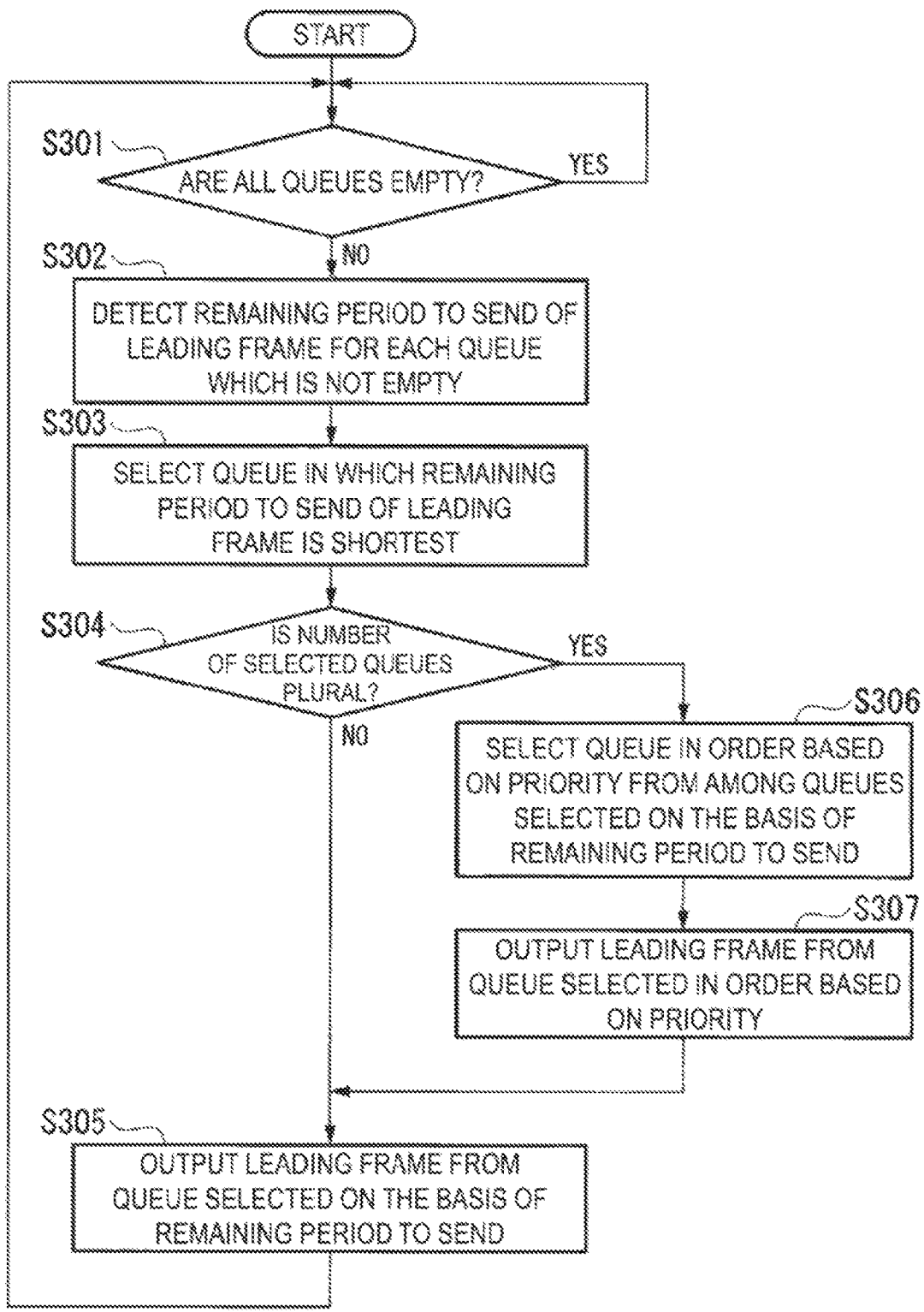
FIG. 5 is a flowchart illustrating an example of operations of a transfer unit according to a second embodiment.

Next, an example of operations of the transfer unit 13 will be described. FIG. 5 is a flowchart illustrating an example of operations of the transfer unit 13. Steps S301 to SS303 illustrated in FIG. 5 are similar to steps S201 to S203 illustrated in FIG. 4.

The transfer unit 13 determines whether a plurality of queues 120 is selected on the basis of the remaining period to send of the leading frame (step S304). In a case where one queue 120 is selected on the basis of the remaining period to send of the leading frame (step S304: NO), the transfer unit 13 outputs the leading frame to the optical line terminal 105 from the queue 120 selected on the basis of the remaining period to send (step S305).

In a case where a plurality of queues 120 is selected on the basis of the remaining period to send of the leading frame (step S304: NO), the transfer unit 13 selects the queue 120 in the order based on the priority of the signal to which the frame belongs from among the queues 120 selected on the basis of the remaining period to send (step S306). The transfer unit 13 outputs the leading frame to the optical line terminal 105 from the queue 120 selected in the order based on the priority (step S307). The transfer unit 13 causes the processing to proceed to step S305.

As described above, the transfer unit 13 (transmitter) according to the second embodiment outputs the leading frame to a predetermined apparatus in the order based on the priority determined in advance for the frame in a case where there is a plurality of leading frames having the shortest remaining period to send.

Thereby, the transfer apparatus 1 according to the second embodiment can improve the transmission efficiency of the frame belonging to the signal having a low priority even in a case where there is a plurality of queues in which the remaining period to send of the leading frame is the shortest.

Third Embodiment

A third embodiment differs from the first and second embodiments in that the signals are classified into a high priority signal group and a low priority signal group. In the third embodiment, differences from the first and second embodiments will be described.

The transfer unit 13 classifies the signals input to the queues 120 into a high priority signal group and a low priority signal group for each queue 120. Conditions for classifying the signals into the high priority signal group and the low priority signal group are determined in advance. For example, the transfer unit 13 classifies the signals to which the frames stored in the queue 120-1 to the queue 120-M (M is an integer which satisfies 1≤M≤(N−1)) belong into the high priority signal group. For example, the transfer unit 13 classifies the signals to which the frames stored in the queue 120-(M+1) to the queue 120-N belong into the low priority signal group.

In a case where the leading frame is stored in the queue 120, the transfer unit 13 detects the remaining periods to send of the leading frames for all of the queues 120 storing the frames belonging to the signals classified into the high priority signal group.

Similar to the first or second embodiment, the transfer unit 13 selects the queue 120 in which the remaining period to send of the leading frame is the shortest, with respect to the signals classified into the high priority signal group. The transfer unit 13 outputs the leading frame belonging to the signal classified as the high priority signal group to the optical line terminal 105 from the queue 120 selected on the basis of the remaining period to send.

The transfer unit 13 detects, for each queue 120, a trigger time to send (TTS) which is the time at which the leading frame to which the signal classified as the low priority signal group belongs is permitted to be output (the time at which an output permission is given to the queue). In a case where the current time is on or after the trigger time to send $TTS_i$, the transfer unit 13 detects the remaining period to send of the leading frame for each queue 120 for the low priority signal group. The transfer unit 13 outputs the leading frame belonging to the signal classified as the low priority signal group to the optical line terminal 105 from the queue 120 selected on the basis of the remaining period to send. The trigger time to send $TTS_i$ is expressed as Equation (2).

$$TTS_i = t_{arrive} + d_i - n^i \qquad (2)$$

Here, $t_{arrive}$ represents the time at which the frame is received. In addition, di represents the delay upper limit value ($0 < d_1 \le d_2 \le \ldots \le d_N$). Further, i is an index of the signal (delay requirement) and is an integer of 1 or greater and N or less. In addition, $n_i$ is a positive value (fixed value) determined in advance for each signal.

Figure 6:
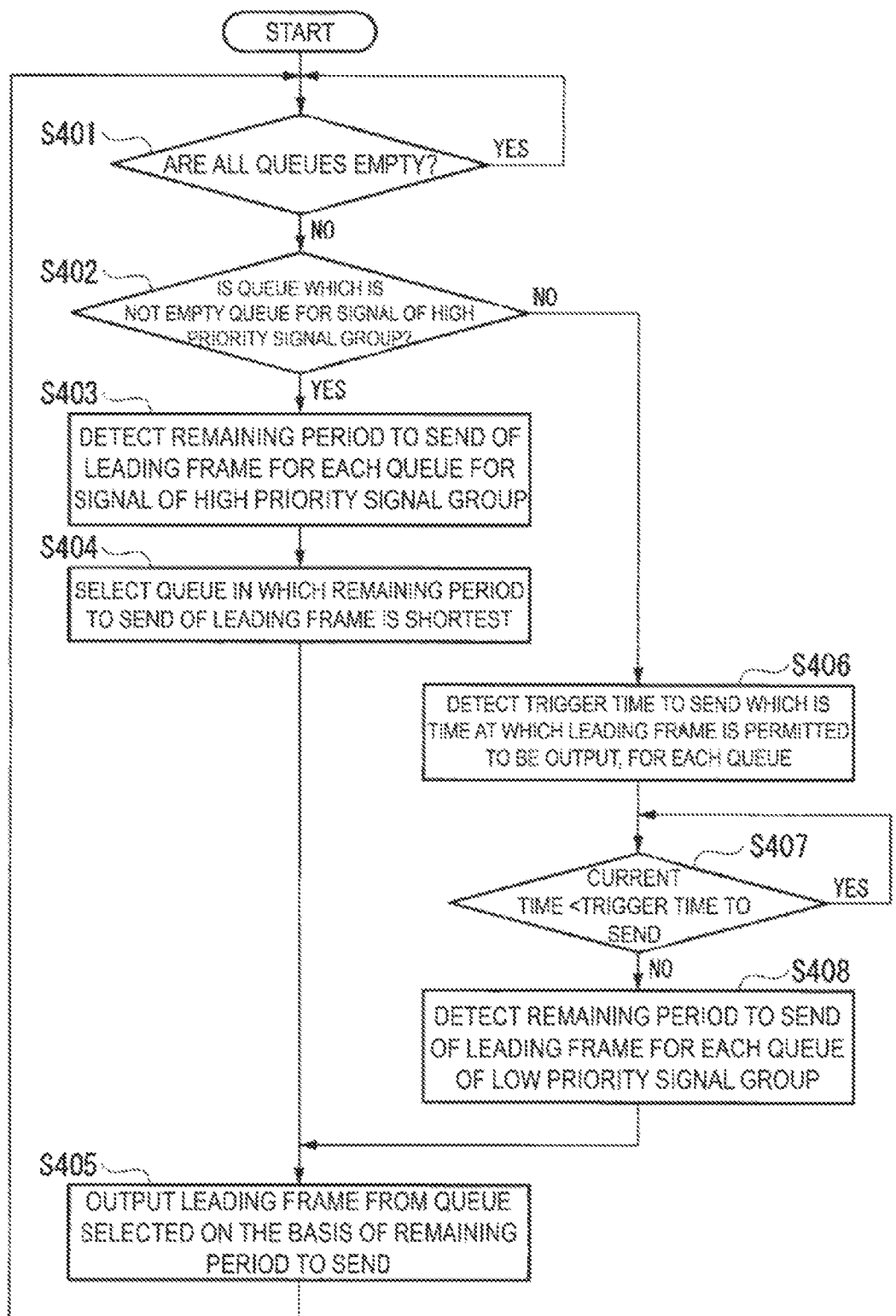
FIG. 6 is a flowchart illustrating an example of operations of a transfer unit according to a third embodiment.

Next, an example of operations of the transfer unit 13 will be described. FIG. 6 is a flowchart illustrating an example of operations of the transfer unit 13. Step S401 illustrated in FIG. 6 is similar to step S301 illustrated in FIG. 5. In a case where the frame is stored in any one queue 120 (step S401: NO), the transfer unit 13 determines whether the queue 120 which is not empty is a queue 120 for a signal of the high priority signal group (step S402).

In a case where the queue 120 which is not empty is a queue 120 for a signal of the high priority signal group (step S402: YES), the transfer unit 13 detects the remaining period to send of the leading frame for each queue 120 for a signal of the high priority signal group (step S403). The transfer unit 13 selects a queue 120 in which the remaining period to send of the leading frame is the shortest (step S404). The transfer unit 13 outputs the leading frame to the optical line terminal 105 from the queue 120 selected on the basis of the remaining period to send (step S405).

In a case where the queue 120 which is not empty is a queue 120 for a signal of the low priority signal group (step S402: NO), the transfer unit 13 detects, for each queue 120, the trigger time to send $TTS_i$ which is the time at which the leading frame of the signal of the low priority signal group is permitted to be output (step S406). The transfer unit 13 determines whether the current time is before the trigger time to send $TTS_i$ (step S407). In a case where the current time is before the trigger time to send $TTS_i$ (step S407: YES), the transfer unit 13 executes the processing of step S407 again after a predetermined period of time. In a case where the current time is on or after the trigger time to send $TTS_i$ (step S407: NO), the transfer unit 13 detects the remaining period to send of the leading frame for each queue 120 for the low priority signal group (step S408). The transfer unit 13 executes the processing of step S405 again.

As described above, the transfer unit 13 (transmitter) according to the third embodiment detects the trigger time to send for each queue 120 determined in advance. The transfer unit 13 outputs the leading frame to a predetermined apparatus on or after the trigger time to send from the queue 120 in which the trigger time to send has been detected.

Thereby, the transfer apparatus 1 according to the third embodiment can improve the transmission efficiency of the frame belonging to the signal having a low priority even in a case where there is a large number of types of delay requirements (delay upper limit value) determined for signals.

Fourth Embodiment

A fourth embodiment differs from the first to third embodiments in that the transfer apparatus 1 multiplexes a frame belonging to a signal for which the delay requirement is determined and a frame belonging to a signal for which the delay requirement is not determined. In the fourth embodiment, differences from the first to third embodiments will be described.

In the fourth embodiment, the number of the types of signals for which the delay requirement is determined is N. The number of the types of signals for which the delay requirement is not determined is P. For example, P is a number equal to or less than N.

Similar to the first to third embodiments, the transfer unit 13 selects the queue 120 in which the remaining period to send of the leading frame is the shortest, with respect to the signals for which the delay requirement is determined.

The transfer unit 13 outputs the leading frame belonging to the signal classified as the high priority signal group to the optical line terminal 105 from the queue 120 selected on the basis of the remaining period to send.

In a case where the frame of the signal for which the delay requirement is determined is stored in any one queue 120, the transfer unit 13 inhibits the leading frame belonging to the signal for which the delay requirement is not determined from being output to the optical line terminal 105. In a case where all of the queues 120 for storing the frame of the signal for which the delay requirement is determined are empty, the transfer unit 13 outputs the leading frame belonging to the signal for which the delay requirement is not determined to the optical line terminal 105. That is, in a case where the frame of the signal for which the delay requirement is determined is not stored in the storage unit 12, the transfer unit 13 outputs the leading frame belonging to the signal for which the delay requirement is not determined to the optical line terminal 105.

Here, the transfer unit 13 outputs the leading frame belonging to the signal for which the delay requirement is not determined to the optical line terminal 105 from the queue 120 selected on the basis of strict priority queuing. The transfer unit 13 may output the leading frame belonging to the signal for which the delay requirement is not determined to the optical line terminal 105 from the queue 120 selected on the basis of weighted fair queuing (WFQ). In a case where the frame belonging to the signal classified as the high priority signal group is newly stored in the queue 120, the transfer unit 13 stops the transfer of the signal for which the delay requirement is not determined.

Figure 7:
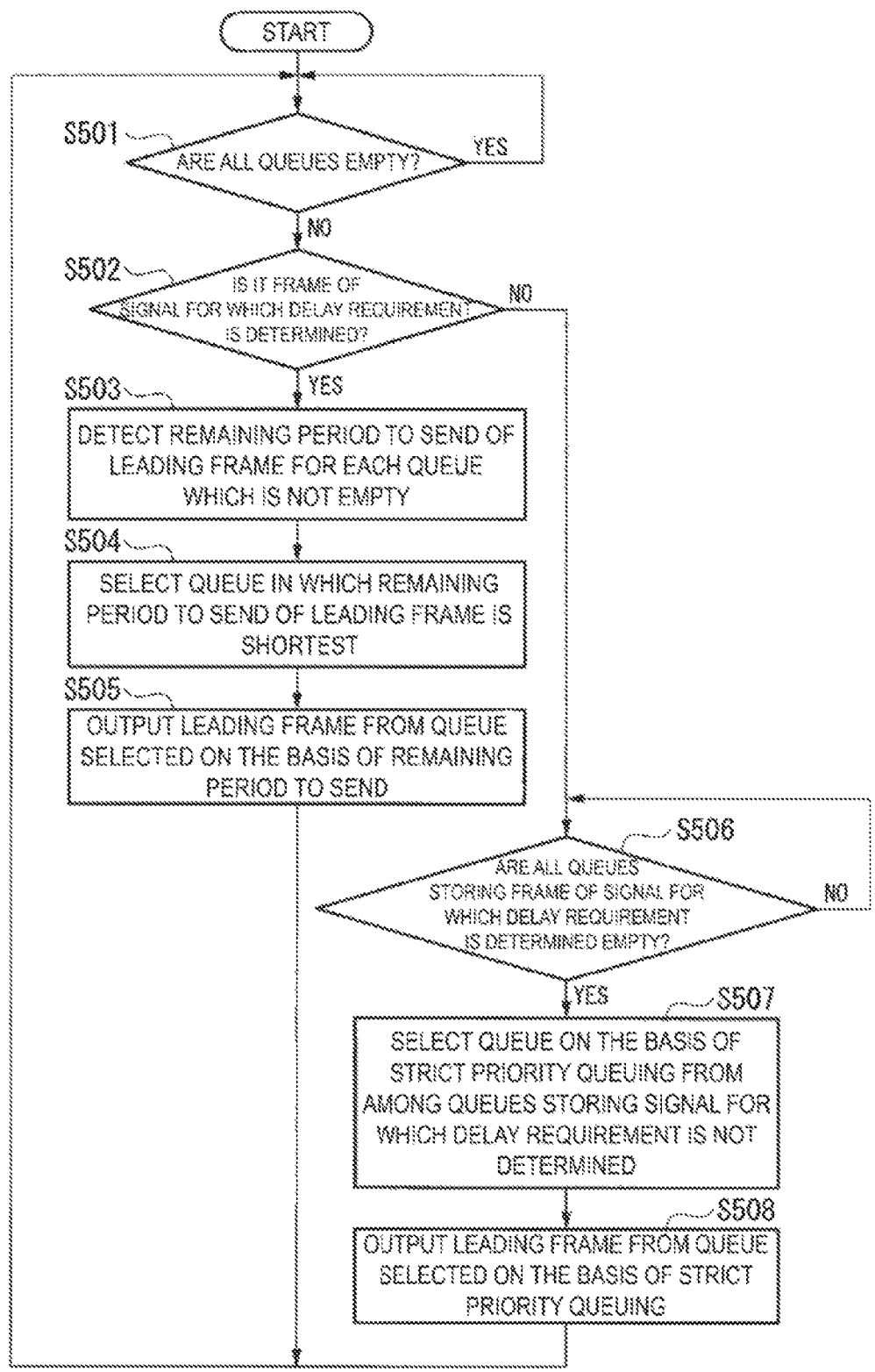
FIG. 7 is a flowchart illustrating an example of operations of a transfer unit according to a fourth embodiment.
Figure 8:
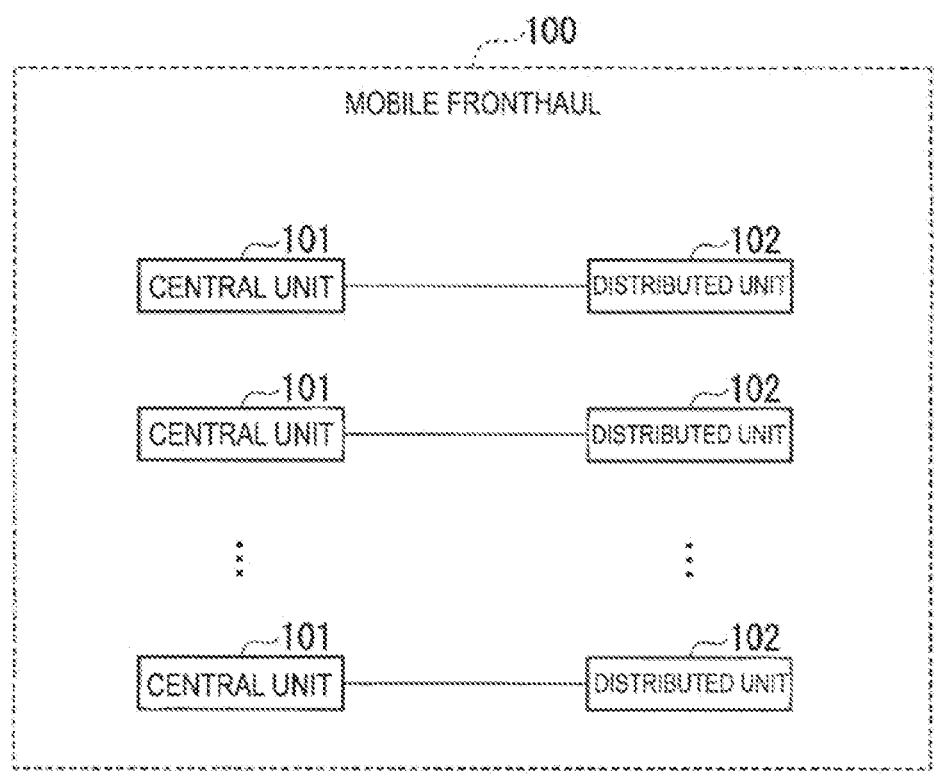
FIG. 8 is a diagram illustrating an example of a configuration of a mobile fronthaul.

Next, an example of operations of the transfer unit 13 will be described. FIG. 7 is a flowchart illustrating an example of operations of the transfer unit 13. Step S501 illustrated in FIG. 7 is similar to step S401 illustrated in FIG. 6. The transfer unit 13 determines whether the delay requirement is determined for the signal to which the frame stored in the queue 120 belongs (step S502).

In a case where the delay requirement is determined for the signal to which the frame stored in the queue 120 belongs (step S502: YES), the transfer unit 13 executes step S503, similar to step S302 illustrated in FIG. 5. The transfer unit 13 executes steps S504 and S505, similar to steps S404 and S405 illustrated in FIG. 6. The transfer unit 13 returns the processing to step S501.

In a case where the delay requirement is not determined for the signal to which the frame stored in the queue 120 belongs (step S502: NO), the transfer unit 13 determines whether all the queues for storing the frame of the signal for which the delay requirement is determined are empty (step S506). In a case where any queue 120 stores the frame of the signal for which the delay requirement is determined (step S506: NO), the transfer unit 13 executes the processing of step S506 again after a predetermined period of time. Thereby, in a case where the frame belonging to the signal classified as the high priority signal group is newly stored in the queue 120, the transfer unit 13 can stop the transfer of the signal for which the delay requirement is not determined.

In a case where all the queues 120 for storing the frame of the signal for which the delay requirement is determined are empty (step S506: YES), the transfer unit 13 selects a queue on the basis of the strict priority queuing from among the queues 120 storing the signal for which the delay requirement is not determined (step S507). The transfer unit 13 outputs the leading frame to the optical line terminal 105 from the queue 120 selected on the basis of the strict priority queuing (step S507).

The transfer unit 13 may execute steps S503 to S505 and steps S506 to S508 in parallel.

As described above, the transfer unit 13 (transmitter) according to the fourth embodiment determines whether the frame for which the delay upper limit value (delay requirement) is determined is stored in the storage unit 12. In a case where the frame for which the delay upper limit value is determined is not stored in the storage unit 12, the transfer unit 13 outputs the leading frame belonging to the signal for which the delay upper limit value is not determined to a predetermined apparatus.

Thereby, the transfer apparatus 1 according to the fourth embodiment can improve the transmission efficiency of the frame belonging to the signal having a low priority even in a case where the frame belonging to the signal for which the delay requirement is determined and the frame belonging to the signal for which the delay requirement is not determined are multiplexed.

The embodiments of the present invention have been described above in detail with reference to the drawings. However, specific configurations are not limited to those embodiments, and include any design or the like within the scope not departing from the gist of the present invention.

For example, the frame in each of the embodiments may be a packet. For example, the transfer apparatus 1 may be provided in the optical line terminal 105. For example, the transfer apparatus 1 may be provided in a layer 2 (L2) switch. For example, the configurations and operations of the transfer apparatuses 1 illustrated in the respective embodiments may be combined with each other.

The transfer apparatuses in the above-described embodiments may be implemented by a computer. In such a case, the transfer apparatuses may be implemented by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

REFERENCE SIGNS LIST

1 Transfer apparatus
10 Timer
11 Distribution unit
12 Storage unit
13 Transfer unit
100 Mobile fronthaul
101 Central unit
102 Distributed unit
103 Transfer apparatus
104 Passive optical network
105 Optical line terminal
106 Optical splitter
107 Optical network unit
108 Distribution unit
109 Storage unit
110 Transfer unit
111 Queue
120 Queue
121 Frame
122 Frame
123 Frame
200 Mobile fronthaul

The invention claimed is:

1. A transfer apparatus comprising:
a processor; and
a storage medium storing computer program instructions, wherein the computer program instructions, when executed by the processor, perform processing of:
identifying a plurality of networks to which frames acquired from the plurality of networks belong, and distributing and storing the frames in the storage medium for each of the plurality of networks based on identification results, the plurality of networks being different from each other in a delay upper limit value of each of the frames;
storing information of a time at which a frame of the frames is stored in the storage medium and the frame in association with each other; and
detecting a period of time for which the frame stays in the storage medium, detecting a remaining period to send which is a remaining time of a time for which the frame is permitted to stay in the storage medium, for each of the frames, based on a difference between the time for which the frame stays in the storage medium and the delay upper limit value, and outputting the frame to a predetermined apparatus based on the remaining period to send;

storing the frames in a queue for each of the networks;

detecting the remaining period to send based on a difference between a time for which a leading frame of the frames of the queue stays in the queue and the delay upper limit value, for each of the leading frames, and outputting the leading frame to a predetermined apparatus based on the remaining period to send;

classifying each of respective signals, to which respective acquired frames input to the queues belong, into a high priority signal group and a low priority signal group for each queue;

detecting, for the queue that is from the low priority signal group, a trigger time to send which is a time at which the leading frame stored in the queue predetermined is permitted to be output, and performing the outputting of the leading frame to a predetermined apparatus on or after the trigger time to send from each of the queues in which the trigger time to send is detected, and, for the queue that is from the high priority signal group, performing the outputting of the leading frame without detecting the trigger time to send.

2. The transfer apparatus according to claim 1, wherein the computer program instructions further perform processing of: outputting the leading frame for which the remaining period to send is shortest to a predetermined apparatus.

3. The transfer apparatus according to claim 1, wherein the computer program instructions further perform processing of: outputting, in a case where the number of the leading frames for which the remaining period to send is shortest is plural, each of the leading frames to a predetermined apparatus in an order based on priority determined for the frames in advance.

4. The transfer apparatus according to claim 1, wherein the computer program instructions further perform processing of: determining whether the frame for which the delay upper limit value is determined is stored in the storage medium, and outputting the leading frame belonging to a signal for which the delay upper limit value is not determined to a predetermined apparatus in a case where the frame for which the delay upper limit value is determined is not stored in the storage medium.

5. A transfer method comprising:

identifying, by a transfer apparatus, a plurality of networks to which frames acquired from the plurality of networks belong, distributing and storing the frames in the storage medium for each of the plurality of networks based on identification results, the plurality of networks being different from each other in a delay upper limit value of each of the frames;

storing, by the transfer apparatus, information of a time at which a frame of the frames is stored in the storage medium and the frame in association with each other; and detecting, by the transfer apparatus, a period of time for which the frame stays in the storage medium, detecting a remaining period to send which is a remaining time of a time for which the frame is permitted to stay in the storage medium, for each of the frames, based on a difference between the time for which the frame stays in the storage medium and the delay upper limit value, and outputting the frame to a predetermined apparatus based on the remaining period to send—storing the frames in a queue for each of the networks;

detecting the remaining period to send based on a difference between a time for which a leading frame of the frames of the queue stays in the queue and the delay upper limit value, for each of the leading frames, and outputting the leading frame to a predetermined apparatus based on the remaining period to send;

classifying each of respective signals, to which respective acquired frames input to the queues belong, into a high priority signal group and a low priority signal group for each queue;

detecting, for the queue that is from the low priority signal group, a trigger time to send which is a time at which the leading frame stored in the queue predetermined is permitted to be output, and performing the outputting of the leading frame to a predetermined apparatus on or after the trigger time to send from each of the queues in which the trigger time to send is detected, and, for the queue that is from the high priority signal group, performing the outputting of the leading frame without detecting the trigger time to send.

6. A non-transitory computer readable medium storing a transfer program for causing a computer to operate as the transfer apparatus according to claim 1.

* * * * *